United States Patent
Wilson

(10) Patent No.: US 6,659,528 B1
(45) Date of Patent: Dec. 9, 2003

(54) METHOD AND APPARATUS FOR SLIDING AND ROTATING A VEHICLE SUN VISOR

(75) Inventor: Douglas J. Wilson, Ft. Gratiot, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/246,159

(22) Filed: Sep. 18, 2002

(51) Int. Cl.[7] .................................................. B60J 3/00
(52) U.S. Cl. .................. 296/97.11; 296/97.8; 296/97.9
(58) Field of Search .............................. 296/97.1, 97.4, 296/97.8, 97.9, 97.11

(56) References Cited

U.S. PATENT DOCUMENTS

| | | | |
|---|---|---|---|
| 1,795,184 A | * 3/1931 | Smith | 248/289.11 |
| 1,808,086 A | * 6/1931 | Ulp | 248/286.1 |
| 4,582,356 A | * 4/1986 | Kaiser et al. | 296/97.11 |
| 4,697,843 A | 10/1987 | Tomforde | |
| 4,904,013 A | 2/1990 | Canadas | |
| 5,267,768 A | 12/1993 | Tsai | |
| 5,409,285 A | 4/1995 | Snyder et al. | |
| 5,645,308 A | * 7/1997 | Fink | 296/97.9 |
| 5,653,490 A | * 8/1997 | Fink et al. | 296/97.11 |
| 5,833,299 A | 11/1998 | Corn | |
| 5,851,046 A | 12/1998 | Kalkman et al. | |
| 5,871,252 A | * 2/1999 | Gute | 296/97.11 |
| 5,887,933 A | 3/1999 | Peterson | |
| 5,924,748 A | * 7/1999 | Zapinski | 296/97.1 |
| 5,934,734 A | * 8/1999 | Wilson | 296/97.11 |
| 5,951,089 A | * 9/1999 | Delus et al. | 296/97.11 |
| 5,967,588 A | * 10/1999 | Collet et al. | 296/97.11 |
| 6,007,135 A | 12/1999 | Alves | |
| 6,010,174 A | * 1/2000 | Murdock et al. | 296/97.11 |
| H1834 H | 2/2000 | Wilson et al. | |
| 6,131,985 A | * 10/2000 | Twietmeyer et al. | 296/97.12 |
| 6,131,987 A | 10/2000 | Rossiter | |
| 6,170,899 B1 | 1/2001 | Corn | |
| 6,174,019 B1 | * 1/2001 | Collet et al. | 296/97.11 |
| 6,216,762 B1 | 4/2001 | Lin | |
| 6,286,887 B1 | 9/2001 | Hashmi | |
| 2002/0011738 A1 | 1/2002 | Viertel et al. | |
| 2002/0030379 A1 | 3/2002 | Sturt et al. | |

FOREIGN PATENT DOCUMENTS

| | | | | |
|---|---|---|---|---|
| BE | 564431 | * | 6/1970 | 296/97.9 |
| DE | 3402416 A1 | * | 7/1985 | 296/97.11 |
| EP | 0 231 440 | | 8/1987 | |
| EP | 0 865 947 | | 9/1998 | |
| FR | 2 458 415 | | 6/1979 | |
| GB | 2 297 529 | | 8/1996 | |
| JP | 2-48218 A | * | 2/1990 | 296/97.8 |

* cited by examiner

Primary Examiner—Stephen T. Gordon
Assistant Examiner—Patricia L. Engle
(74) Attorney, Agent, or Firm—Bill C. Panagos

(57) ABSTRACT

A spring clip assembly and method are provided for supporting a visor body relative to a visor arm. Initially, a visor arm having a substantially cylindrical outer surface and a recessed detent portion is provided. A visor body is also provided and has a spring clip assembly attached thereto. The spring clip assembly includes a housing, a spring disposed within the housing, and a bushing attached to the spring for sliding engagement with the visor arm. The visor body is then rotated about the visor arm between a first position wherein the roller contacts the detent portion of the visor arm, and a second position wherein the bushing contacts the cylindrical surface of the visor arm. The spring maintains the bushing in sliding engagement with the visor arm and biases the bushing toward the visor arm so as to provide a clamping force when in the first and second positions.

17 Claims, 5 Drawing Sheets

US 6,659,528 B1

METHOD AND APPARATUS FOR SLIDING AND ROTATING A VEHICLE SUN VISOR

BACKGROUND OF THE INVENTION

The present invention relates to sun visors mounted in vehicles and more particularly to an improved method and apparatus for sliding and rotating a sun visor.

When driving a vehicle it is desirable to shield an occupant's eyes from glaring sunlight which enters the vehicle interior through the windshield or the side windows. As a result, vehicle interiors are usually equipped with sun visors. Typically, a sun visor slides adjacent the vehicle windshield or side window to provide different areas of effective sun blocking protection. Such slidable sun visors must minimize the slide effort of the visor, while still controlling lateral play and flutter, typically known as backlash, during operation of the vehicle. Unfortunately, the tighter the design fit between mating surfaces within the visor assembly, the greater the slide effort must be. Typically, the slide bar or arm and the visor body each have a frictional engagement member for providing frictional engagement between each other. However, the frictional forces provided by the frictional engagement members cannot be selectively applied and released, and are typically constant. As a result, the constant, relatively high frictional forces must be overcome in order to slide the visor body along the slide bar. Therefore, it would be advantageous to provide an improved method and apparatus for sliding and rotating a sun visor.

SUMMARY OF THE INVENTION

This invention relates to an improved method and apparatus for sliding and rotating a sun visor. Initially, a visor arm having a substantially cylindrical outer surface and a recessed detent portion is provided. A visor body has a spring clip assembly attached thereto and is also provided. The spring clip assembly includes a housing, a spring disposed within the housing, and a bushing for sliding engagement with the visor arm attached to the spring. The visor body is then rotated about the visor arm between a first position wherein the bushing contacts the detent portion of the visor arm, and a second position wherein the bushing contacts the cylindrical outer surface of the visor arm. The spring biases the bushing toward the visor arm so as to provide a clamping force on the visor arm when the visor body is in the first position and when the visor body is in the second position. Preferably, the bushing is a roller. The visor body is movable to an extended position, wherein the rollers roll along the visor arm. The spring biases the rollers toward the visor arm so as to provide a clamping force during movement of the visor body toward the extended position.

Various objects and advantages of this invention will become apparent to those skilled in the art from the following detailed description of the preferred embodiment, when read in light of the accompanying drawings.

DETAILED DESCRIPTION OF THE INVENTION

Figure 1:
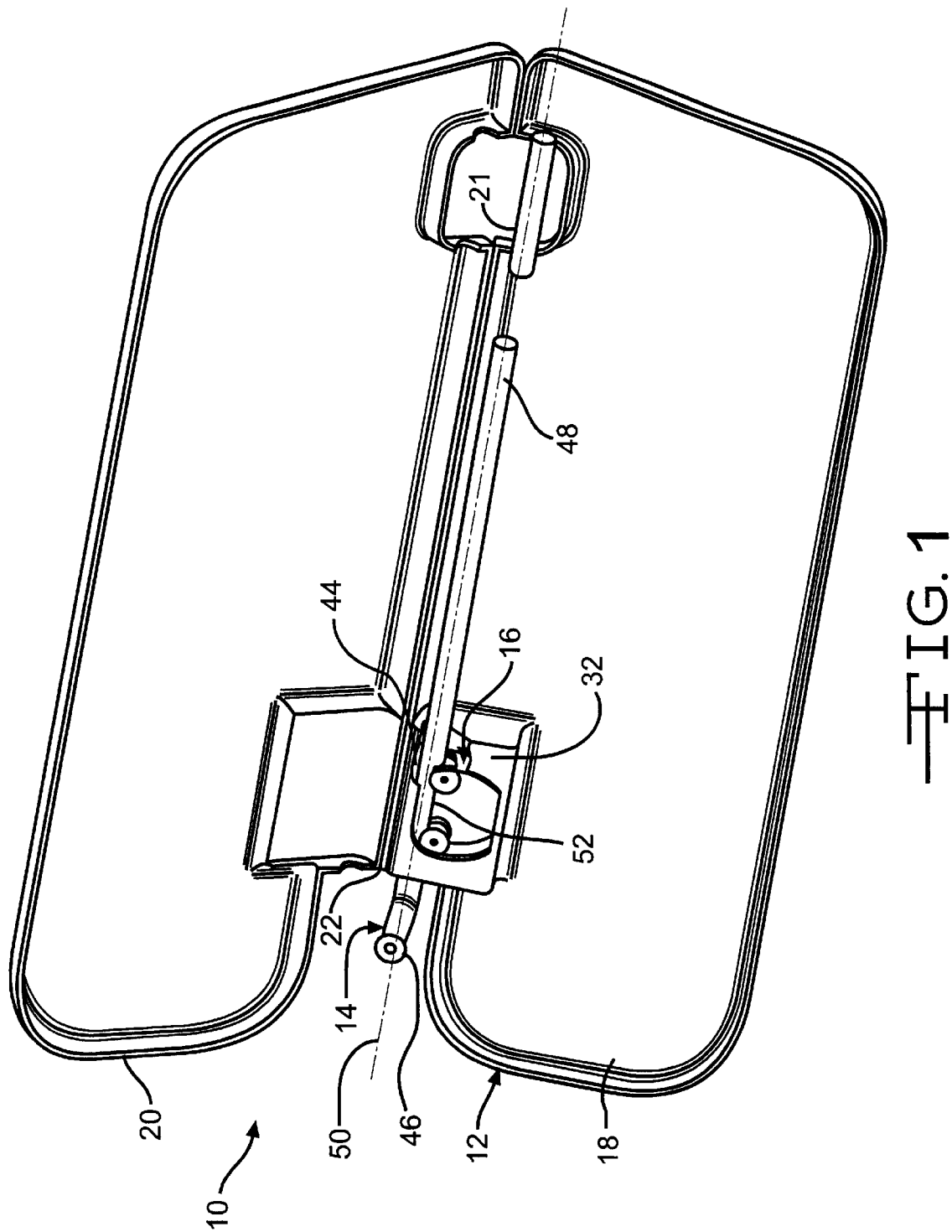
FIG. 1 is a perspective view of a sun visor assembly according to the invention in an open, unsealed condition.

As illustrated in FIG. 1, there is generally shown at 10 a slidable sun visor assembly according to the invention. The sun visor assembly 10 includes a body or core 12, a cover 13, a visor arm 14, and a spring clip assembly 16, as will be described in detail herein. The core 12, which preferably comprises a thermoplastic such as polypropylene, has a substantially clamshell configuration. The core 12 includes first and second halves 18 and 20, respectively, defined by a hinge 22. The cover 13 can be of any desired material, such as a foam backed cloth or vinyl, and is disposed around the visor to cover the outer sides of the first and second halves 18 and 20. An example of such a visor core is disclosed in U.S. Pat. No. 5,887,933 to Peterson, and is incorporated herein by reference.

The sun visor assembly 10 can also include a support pin 21. Preferably, the support pin 21 is detachably mounted in a mounting recess of a mount (not shown), which is fastened to the body of the vehicle, preferably through a headliner 26, as is well known in the art. The support pin 21 is preferably arranged in line with the visor arm 14 to form a common rotational axis for the visor assembly 10 between a raised position adjacent the headliner and a lowered position adjacent, as will be described in detail herein.

Figure 2:
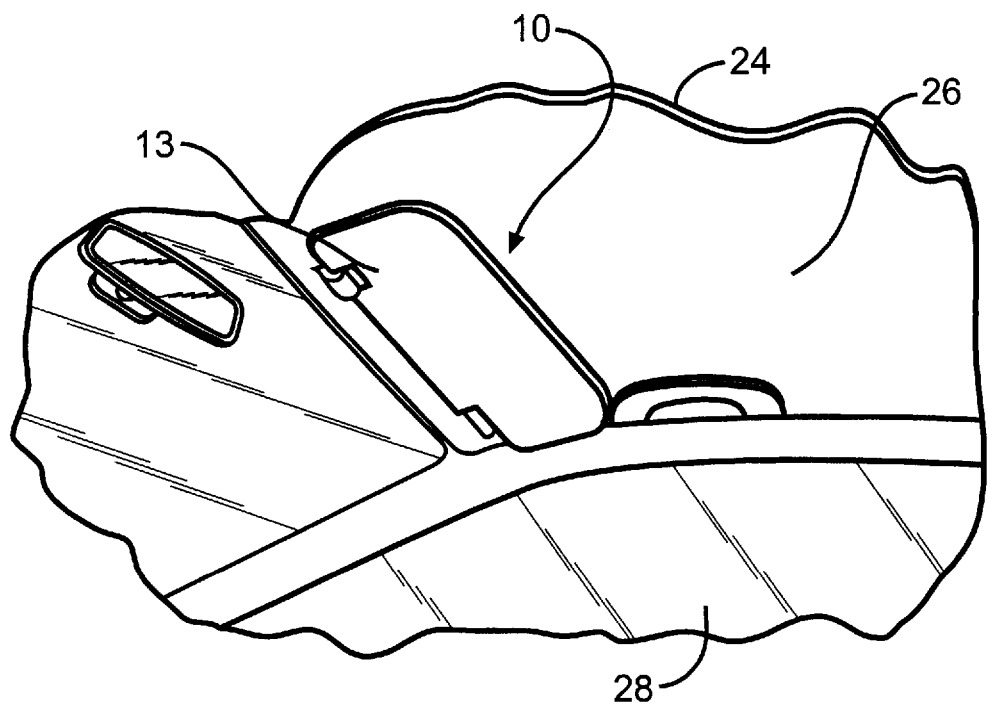
FIG. 2 is a perspective view of the sun visor assembly illustrated in FIG. 1 shown in a raised, stored position against a headliner of a vehicle.
Figure 3:
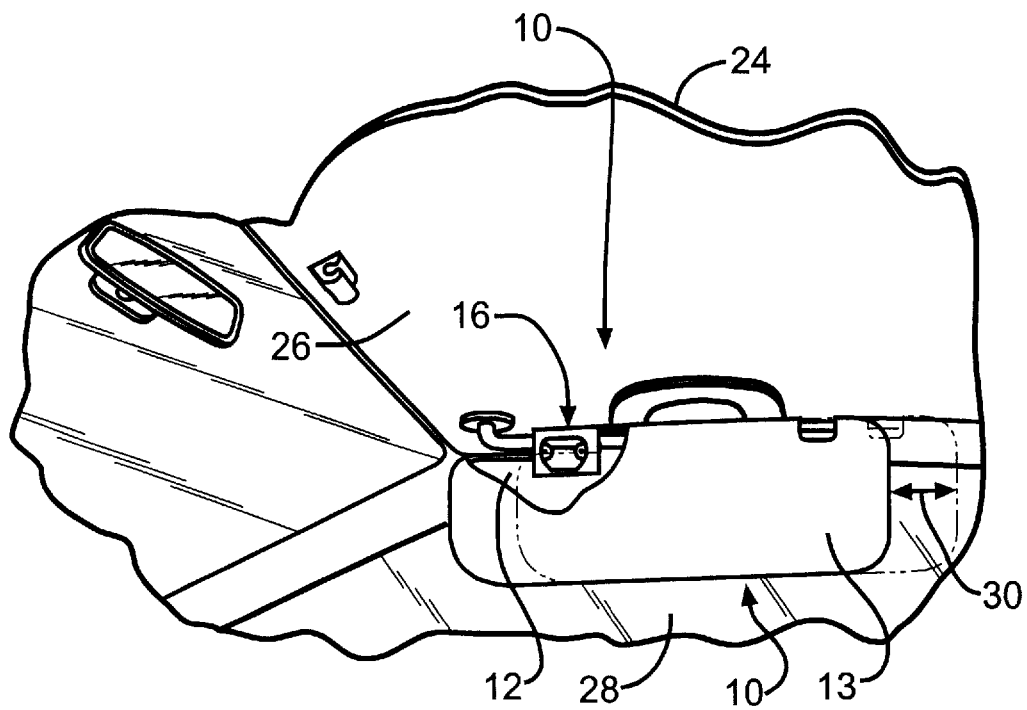
FIG. 3 is a perspective view, partially cut-away, of the sun visor assembly illustrated in FIG. 1 shown in a first side window use position in the vehicle, with a second side window use position shown in phantom line.

FIGS. 2 and 3 show the slidable sun visor assembly 10 mounted to a roof 24 through a headliner 26 of a vehicle. The visor assembly 10 can be rotated and pivoted between the raised, stored position against the vehicle headliner 26, as shown in FIG. 2, and the lowered position adjacent a vehicle window, such as side window 28, as shown in FIG. 3. The visor assembly 10 can also be laterally adjusted, as illustrated by arrow 30 in FIG. 3, for providing optimum sun blocking.

Figure 4:
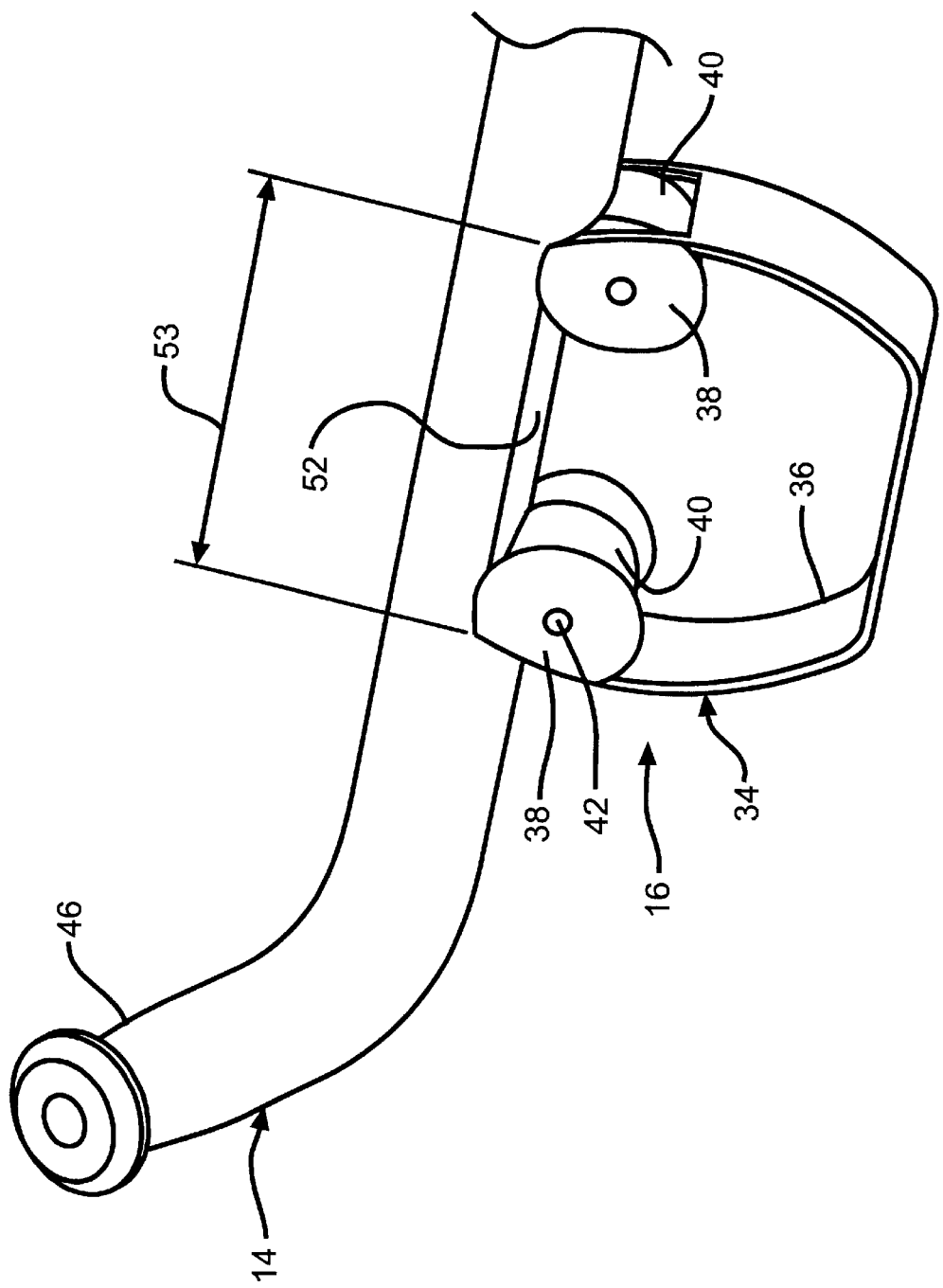
FIG. 4 is an enlarged perspective view of the spring clip assembly illustrated in FIG. 1, illustrated with the housing removed.
Figure 5:
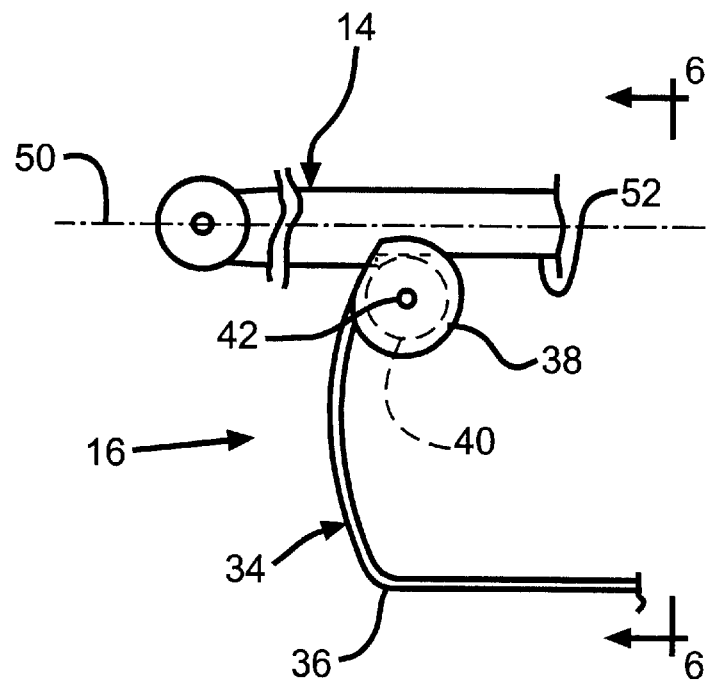
FIG. 5 is an enlarged elevational view, partially cut-away, of the spring clip assembly illustrated in FIG. 4.
Figure 6:
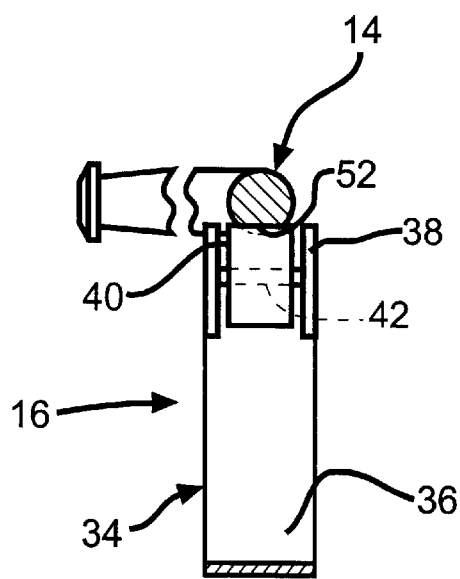
FIG. 6 is a cross sectional side view of the spring clip taken along line 6—6 of FIG. 5.

As shown in FIGS. 1 and 4, the visor core 12 includes the spring clip assembly 16. The spring clip assembly 16 includes a housing 32 attached to an inner surface of the visor core 12. The housing 32 can be formed of any desired material. Steel is a preferred material for the housing due its relative strength and rigidity, although such is not required.

As best shown in FIG. 4, a spring assembly 34 is disposed within the housing 32. The spring assembly 34 includes a spring 36. Preferably, the spring 36 is a substantially U-shaped beam or flat spring, although such is not required. The spring 36 defines spring ends at the ends. The spring 36 is preferably formed of spring steel. Retainers 38 are preferably attached at the ends of the U-shaped spring 36. A pair of retainers 38 are provided in the embodiment illustrated in FIG. 4, however such is not required. For example, the spring assembly 34 can include a spring 36 having only one retainer 38 attached at each end of the spring 36. The retainers 38 are preferably a rigid material such as spring steel and can be attached to the spring by any desired method. Preferably, the retainers 38 are integrally formed with the spring 36 during a conventional stamping process, although such is not required. The retainers 38 can also be separately formed and attached to the spring 36 by any desired method, such as welding.

Preferably, bushings are disposed between the ends of the U-shaped spring 36 the visor arm 14, and slidingly engage the visor arm 14. More preferably, the bushings are substantially cylindrical rollers 40, as shown in FIG. 4. The rollers 40 are rotatably attached to the retainers 38 such that each roller 40 can freely rotate without engaging the spring 36 or the housing 32. Preferably, the rollers 40 are attached to the retainers 38 by pins 42, although such is not required. The rollers 40 can also be mounted between the spring 36 and the visor arm 14 by any desired method. Although in the illustrated embodiment the bushings have been shown as rollers 40, any other desired type of bushings may be used. For example, the bushing may be integrally formed at the spring ends of the U-shaped spring 36.

When disposed in the housing 32, as illustrated in FIG. 1, the rollers 40 of the spring assembly 16 and the housing 32 define a passageway 44 for receiving the visor arm 14. The visor arm 14 has a substantially cylindrical outer surface, and is preferably substantially L-shaped, with first and second ends 46 and 48, respectively. The first end 46 is preferably mounted to the roof 24 and/or headliner 26 of the vehicle in any desired manner. Preferably, the first end 46 is mounted within a mounting recess of a mounting bracket (not shown) fastened to the body of the vehicle through the headliner 26.

The second end 48 extends through the passageway 44 of the housing 32, and has an axis 50 about which the visor core 12 can rotate. A substantially flat recessed surface 52 extends a desired distance 53. Preferably, the distance 53 is greater than or equal to a distance between the rollers 40, although such is not required. The flat recessed surface 52 can extend any desired distance and, as such, can extend substantially the length of the visor arm 14. The flat recessed surface 52 defines a detent portion of the visor arm 14.

As shown in FIGS. 1 and 4, the spring assembly 34 biases the rollers 40 toward the visor arm 14, such that the rollers 40 are maintained in sliding engagement with the visor arm 14 in the raised position and in the lowered position. The retainers 38 maintain the visor arm 14 substantially centered on the rollers 40.

During operation, rotational movement of the visor core 12 about the visor arm 14 causes the visor core 12 to move between a first position wherein the rollers 40 contact the detent portion 52 of the visor arm 14, such as the raised position shown in FIG. 2, and a second position wherein the rollers 40 contact the cylindrical outer surface of the visor arm 14, such as the lowered position shown in FIG. 3. The spring 36 urges the rollers 40 toward the visor arm 14 so as to provide a clamping force on the visor arm 14 when the visor core 12 is in the first position and when the visor core 12 is in the second position. Since the rollers 40 are in constant contact with the visor arm 14, the clamping force on the visor arm 14 is also constant. Such a constant clamping force substantially eliminates the flutter or backlash between the visor core 12 and the visor arm 14.

During lateral adjustment of the visor core 12, as shown by arrow 30 in FIG. 3, the visor core 12 is moved to an extended position. During such lateral movement of the visor core 12 to the extended position, the rollers 40 roll along the visor arm 14 while the spring 36 urges the rollers 40 toward the visor arm 14 so as to provide a clamping force on the visor arm 14. Such a clamping force further substantially eliminates the flutter or backlash between the visor core 12 and the visor arm 14 during the lateral adjustment of the visor core 12.

Figure 7:
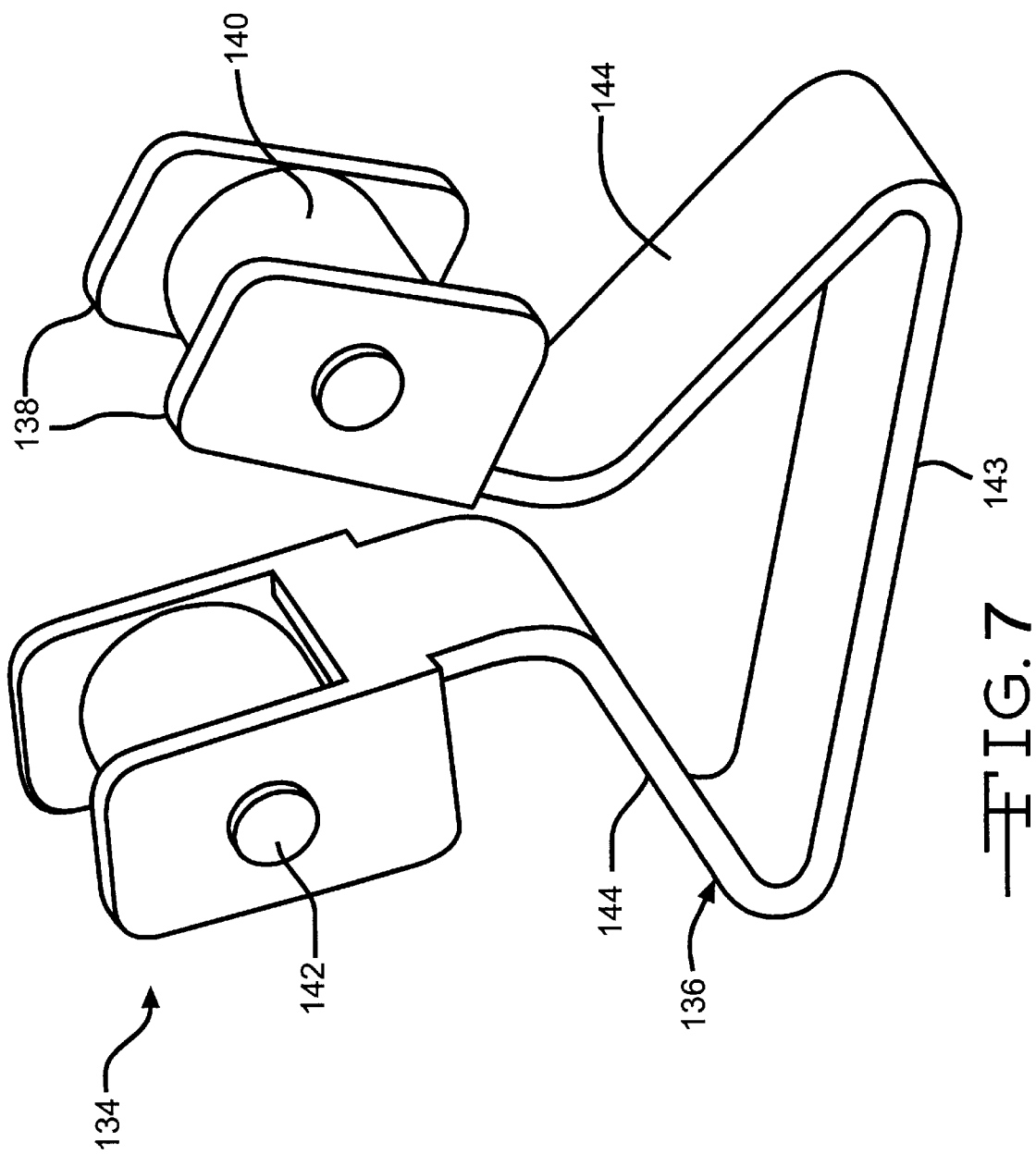
FIG. 7 is an enlarged perspective view of an alternate embodiment of the spring clip assembly according to the invention, illustrated with the housing removed.

An alternate embodiment of the spring assembly is illustrated generally at 134 in FIG. 7. The spring assembly 134 is preferably disposed within a housing (not shown) substantially identical to the housing 32. The spring assembly 134 includes a spring 136. Preferably, the spring 136 is a beam or flat spring, although such is not required. The spring 136 includes a base 143 and upwardly extending legs 144 defining spring ends. A central portion of each leg is bent inwardly such that a lower portion of the spring has a substantially triangular shape. The spring 136 is preferably formed of spring steel.

Retainers 138 are attached at the spring ends of the spring legs 144. A pair of retainers 138 are provided in the embodiment illustrated in FIG. 7, however such is not required. For example, the spring assembly 134 can include a spring 136 having only one retainer 138 attached at an end of each spring leg 144. The retainers 138 are preferably a rigid material such as steel and can be attached to the spring by any desired method. Preferably, the retainers 138 are integrally formed with the spring 136 during a conventional stamping process, although such is not required. The retainers 138 can also be separately formed and attached to the spring 136 by any desired method, such as welding. Substantially rectangular retainers 138 are provided in the embodiment illustrated in FIG. 7, however such is not required. The retainers 138 can also have any desired shape.

Bushings are disposed between the spring ends of the spring legs 144. Preferably, the bushings are substantially cylindrical rollers 140, and are rotatably attached to the retainers 138 such that each roller 140 can freely rotate without engaging the spring 136 or the housing 32. Preferably, the rollers 140 are attached to the retainers 138 by pins 142, although such is not required. The rollers 140 can be attached to the retainers 138 by any desired method. As explained herein, the bushing may be integrally formed at the spring ends of the U-shaped spring 36.

As described regarding the spring assembly 34, the spring 136 of the spring assembly 134 urges the rollers 140 toward the visor arm 14 so as to provide a clamping force on the visor arm 14 when the visor core 12 is in the first position and when the visor core 12 is in the second position. Since the rollers 140 are in constant contact with the visor arm 14, the clamping force on the visor arm 14 is also constant. The clamping force substantially eliminates the flutter or backlash between the visor assembly 10 and the visor arm 14.

The principle and mode of operation of this invention have been described in its preferred embodiment. However, it should be noted that this invention may be practiced otherwise than as specifically illustrated and described without departing from its scope. For example, modifications to the invention can include, but are not limited to, modifying the shape of the spring, retainer, bushings, and visor arm.

What is claimed is:

1. A spring clip assembly for supporting a visor body relative to a visor arm, said spring clip assembly comprising:

a housing attached to said visor body;

a visor arm having a substantially cylindrical outer surface and a recessed detent portion;

a roller for engagement with said visor arm; and a spring disposed within said housing, said spring biasing said roller toward said visor arm;

wherein rotational movement of said visor body about said visor arm causes said visor body to move between a first position wherein said roller contacts the detent portion of said visor arm, and a second position wherein said roller contacts the cylindrical outer surface of said visor arm, said spring biasing said roller toward said visor arm so as to provide a clamping force on said visor arm when said visor body is in the first position and when said visor body is in the second position.

2. The spring clip assembly according to claim 1, wherein said spring clip assembly includes a plurality of rollers.

3. The spring clip assembly according to claim 1, wherein said recessed detent portion of said visor arm is substantially flat.

4. The spring clip assembly according to claim 1, said roller being in rolling engagement with said visor arm when said visor body is in the first position and when said visor body is in the second position.

5. The spring clip assembly according to claim 1, wherein said roller is rotatably mounted on said spring.

6. The spring clip assembly according to claim 1, wherein said visor body is moved to an extended position when said roller rolls along said visor arm.

7. The spring clip assembly according to claim 2, wherein said spring is a substantially U-shaped flat spring.

8. The spring clip assembly according to claim 7, wherein said rollers are mounted on the ends of the U-shaped spring.

9. A method of supporting a visor body relative to a visor arm, the method comprising the steps of:
  a. providing a visor arm having a substantially cylindrical outer surface and a recessed detent portion;
  b. providing a visor body having a spring clip assembly attached thereto, the spring clip assembly comprising a housing, a spring disposed within the housing, and a roller attached to the spring, the roller for engagement with the visor arm;
  c. rotating the visor body about the visor arm between a first position wherein the roller contacts the detent portion of the visor arm, and a second position wherein the roller contacts the cylindrical outer surface of the visor arm, the spring biasing the roller toward the visor arm so as to provide a clamping force on the visor arm when the visor body is in the first position and when the visor body is in the second position; and
  d. rolling the visor body along the visor arm when the visor body is in the first position and when the visor body is in the second position, the spring maintaining the roller in rolling engagement with the visor arm.

10. The method according to claim 9, wherein the spring clip assembly includes a plurality of rollers.

11. The method according to claim 9, wherein the recessed detent portion of the visor arm is substantially flat.

12. The method according to claim 9, wherein the spring is a substantially U-shaped flat spring.

13. The method according to claim 10 including a step (e), step (e) including moving the visor body to an extended position wherein the rollers roll along the visor arm, the spring biasing the rollers toward the visor arm so as to provide a clamping force on the visor arm during movement of the visor body toward the extended position.

14. A spring clip assembly for supporting a visor body relative to a visor arm, said spring clip assembly comprising:
  a housing attached to said visor body;
  a visor arm having a substantially cylindrical outer surface;
  a plurality of rollers for rolling engagement with said visor arm; and
  a flat spring disposed within said housing, said spring biasing said rollers toward said visor arm.

15. The spring clip assembly according to claim 14, wherein said rollers support said visor body on said visor arm.

16. The spring clip assembly according to claim 14, wherein said spring is a substantially U-shaped flat spring.

17. The spring clip assembly according to claim 16, wherein said rollers are mounted on the ends of the U-shaped spring.

* * * * *